US011167462B2

(12) United States Patent
Barrios Laguna

(10) Patent No.: US 11,167,462 B2
(45) Date of Patent: Nov. 9, 2021

(54) BEARING SYSTEM FOR MOLDS AND METHOD FOR REGULATING THE POSITION OF A MOVING PART OF A MOLD USING SAID BEARING SYSTEM

(71) Applicant: CIE AUTOMOTIVE, S.A., Bilbao (ES)

(72) Inventor: Antonio Barrios Laguna, Bilbao (ES)

(73) Assignee: CIE AUTOMOTIVE, S.A., Bilbao (ES)

( * ) Notice: Subject to any disclaimer, the term of this patent is extended or adjusted under 35 U.S.C. 154(b) by 43 days.

(21) Appl. No.: 16/615,480

(22) PCT Filed: May 23, 2017

(86) PCT No.: PCT/ES2017/070343
§ 371 (c)(1),
(2) Date: Nov. 21, 2019

(87) PCT Pub. No.: WO2018/215672
PCT Pub. Date: Nov. 29, 2018

(65) Prior Publication Data
US 2020/0122370 A1 Apr. 23, 2020

(51) Int. Cl.
*B29C 45/17* (2006.01)
*B29C 33/30* (2006.01)

(52) U.S. Cl.
CPC ........ *B29C 45/1761* (2013.01); *B29C 33/305* (2013.01); *B29C 45/1742* (2013.01)

(58) Field of Classification Search
CPC . B29C 45/1742; B29C 45/1761; B29C 45/36; B29C 2045/1788; B29C 2045/363; B29C 33/303; B29C 33/305
See application file for complete search history.

(56) References Cited

U.S. PATENT DOCUMENTS 3,674,400 A    7/1972  Sauerbruch
4,315,728 A *  2/1982  Hehl ...................... B29C 45/17
                                                    425/450.1
(Continued)

FOREIGN PATENT DOCUMENTS

DE    10342386     4/2004
JP    60149411     8/1985
WO    2006018400   2/2006

OTHER PUBLICATIONS

English translation of International Search Report for PCT/ES2017/070343 dated Oct. 2, 2017.
(Continued)

*Primary Examiner* — James P Mackey
(74) *Attorney, Agent, or Firm* — Gottlieb, Rackman & Reisman, P.C.

(57) ABSTRACT

The invention relates to a bearing system for molds, wherein the mold includes a fixed part and a moving part (2), the bearing system comprising a sliding mold carrier (3) provided with vertically movable support elements (5) for bearing the moving part (2) of the mold, wherein said support elements (5) are hydraulic support elements.
The invention also relates to a method for regulating the position of a moving part (2) of a mold comprising the following steps: assembling the moving part (2) of the mold; vertically and sequentially moving the hydraulic support elements (5) until they detect a pre-determined pressure; and stopping the vertical movement of each hydraulic support element (5) when said pre-determined pressure is detected. The invention allows for comfortable and efficient regulation of the support points of the sliding mold carrier with the moving part of an injection mold.

6 Claims, 2 Drawing Sheets

(56) References Cited

U.S. PATENT DOCUMENTS

| | | | |
|---|---|---|---|
| 5,249,951 A | 10/1993 | Leonhartsberger | |
| 5,328,346 A * | 7/1994 | Kodric | B29C 45/1761 100/258 A |
| 5,338,171 A * | 8/1994 | Hayakawa | B29C 45/1747 425/138 |
| 5,800,843 A * | 9/1998 | Kappelmuller | B29C 45/1761 425/150 |
| 7,241,133 B2 * | 7/2007 | Wang | B29C 45/1761 425/168 |
| 7,399,441 B2 * | 7/2008 | Wohlrab | B29C 45/1761 264/328.1 |
| 2007/0042076 A1 | 2/2007 | Wang | |

OTHER PUBLICATIONS

Written Opinion of the Int'l Searching Authority for PCT/ES2017/070343.

\* cited by examiner

BEARING SYSTEM FOR MOLDS AND METHOD FOR REGULATING THE POSITION OF A MOVING PART OF A MOLD USING SAID BEARING SYSTEM

This application is the U.S. National Stage application of PCT/ES2017/070343, filed on May 23, 2017.

The present invention relates to a bearing system for molds that bears the weight of the moving part of an injection mold, and a method for regulating the position of a moving part of a mold using said bearing system.

BACKGROUND OF THE INVENTION

Conventional injection molds comprise a fixed part and a moving part. The fixed part is perfectly centered and immobile with respect to the injection machine.

In turn, the moving part moves horizontally over sliding elements to close the mold. This moving part has a very large weight, over 7,000 kg, and is off-centered with respect to the sliding elements of the machine; this means that the sliding elements are subjected to significant wear. Likewise, the moving part of the mold tends to pull away vertically, and when the machine is closed there are problems for vertically centering the moving part with respect to the fixed part.

To prevent the entire weight of the moving part of the mold from being borne by fixing flanges and to thereby reduce the wear of the sliding elements, a sliding mold carrier is usually arranged. This sliding mold carrier is normally a beam integral with the moving plate of the injection machine, where the moving part of the mold is supported.

Furthermore, the height of the support points between the moving part of the mold and the sliding mold carrier requires being regulated. Said height regulation is done today by means of threaded tension devices, which are tightened or loosened in order to move these support points.

However, this regulation by means of threaded tension devices is expensive and uncomfortable, and there is no certainty that the regulation will be done efficiently.

Therefore, the objective of the present invention is to provide a bearing system and a method which allows for a comfortable and efficient regulation of the support points of the sliding mold carrier with the moving part of an injection mold.

DESCRIPTION OF THE INVENTION

The mentioned drawbacks are solved by the bearing system and the method of the invention, having other advantages that will be described below.

According to a first aspect, the bearing system for molds according to the present invention comprises a sliding mold carrier provided with vertically movable support elements for bearing the moving part of the mold and is characterized in that said support elements are hydraulic support elements.

Advantageously, said hydraulic support elements comprise two or more hydraulic cylinders and are arranged such that each hydraulic support element goes through the sliding mold carrier vertically, projecting in the upper and lower portions.

Preferably, each hydraulic cylinder comprises a guard at the upper end thereof, and each hydraulic support element further comprises a blocking flange, which is advantageously arranged in the lower part of each hydraulic support element.

Under normal conditions, this flange is mechanically blocked, and in order to be unblocked (an operation that must be done in order to vertically move the support elements) it must be hydraulically operated. This allows being able to completely dispense with the hydraulics for maintaining the position of the support elements once the height thereof is adjusted.

Furthermore, the bearing system comprises a regulating plate on each side for regulating the horizontal positioning of the sliding mold carrier with respect to the moving plate of the injection machine.

According to a second aspect, the present invention relates to a method for regulating the position of the support elements with respect to a moving part of a mold using the bearing system mentioned above, comprising the following steps:

assembling the moving part of the mold;

vertically and sequentially moving the hydraulic support elements until they detect a pre-determined pressure; this pressure is programmable and must be adjusted taking into account the dimensions of the hydraulic cylinders that are assembled, and the weight of the part of the mold with which work is to be done. On a conceptual level, as this pressure builds up, it assures that the support elements touch the surface of the mold, and the force they must apply must be in the order of about 10% of the weight of the mold in order to assure that the mold is neither vertically moved nor forced.

stopping the vertical movement of each hydraulic support element and blocking the vertical movement of each hydraulic support element by means of the flange when said pre-determined pressure is detected.

At least the following advantages are achieved with the bearing system and method according to the present invention:

The position of the moving part of the mold is adjusted in a much quicker, much simpler and more effective manner for the operator;

Wear of components is reduced so costs due to stoppage, replacement, repairs of the mold, etc., are saved.

Mold failures due to closing the machine while the two parts of the mold are slightly misaligned are reduced.

Dimensional issues of the injected parts are reduced as the two parts of the mold are assured to be vertically aligned.

BRIEF DESCRIPTION OF THE DRAWINGS

To better understand the foregoing, a set of drawings is attached in which a practical embodiment has been depicted schematically and in a non-limiting manner.

DESCRIPTION OF A PREFERRED EMBODIMENT

Figure 1:
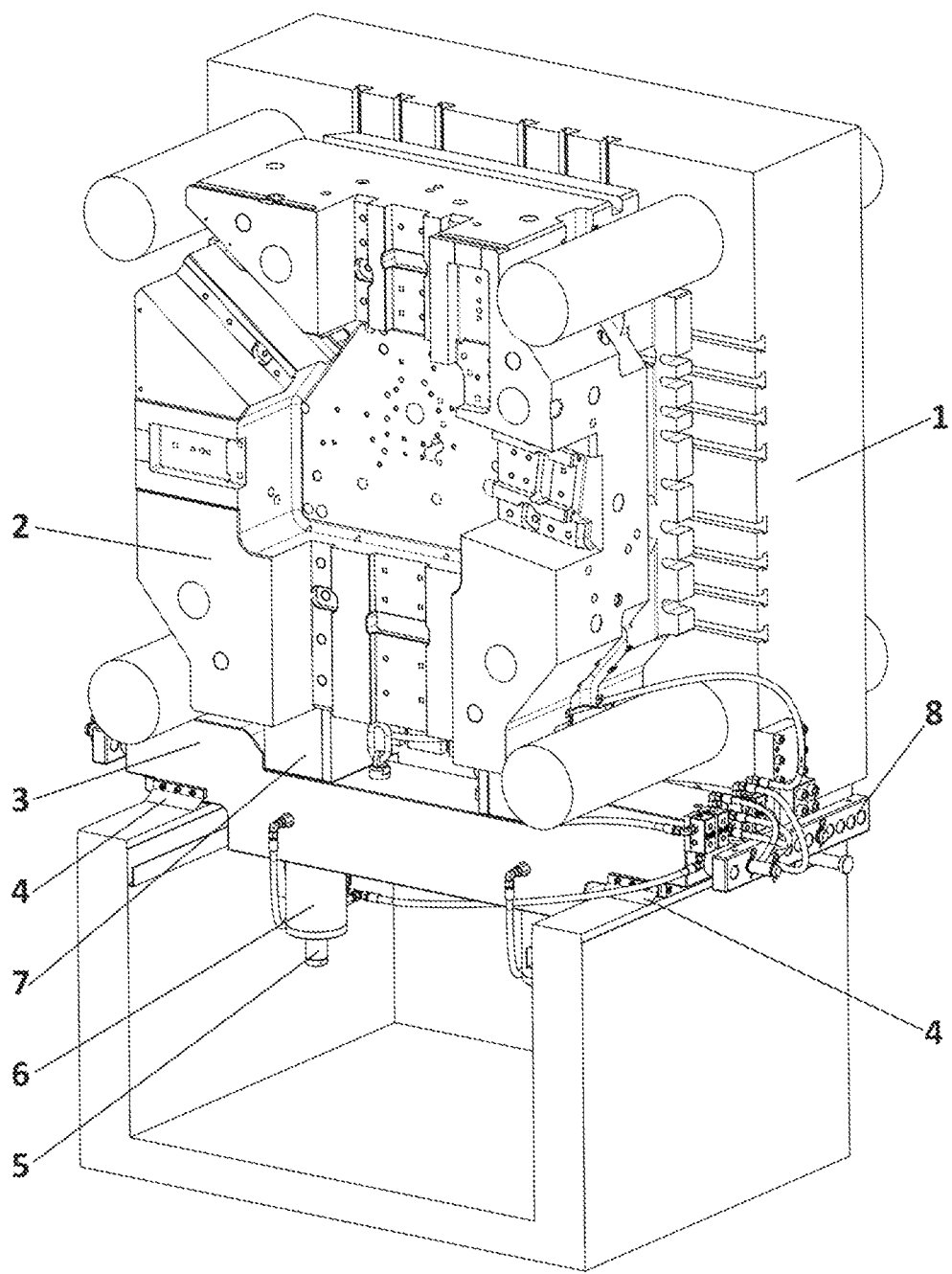
FIG. 1 is a perspective view of the bearing system for molds according to the present invention, assembled in a mold, in which the moving part of said mold is shown.
Figure 2:
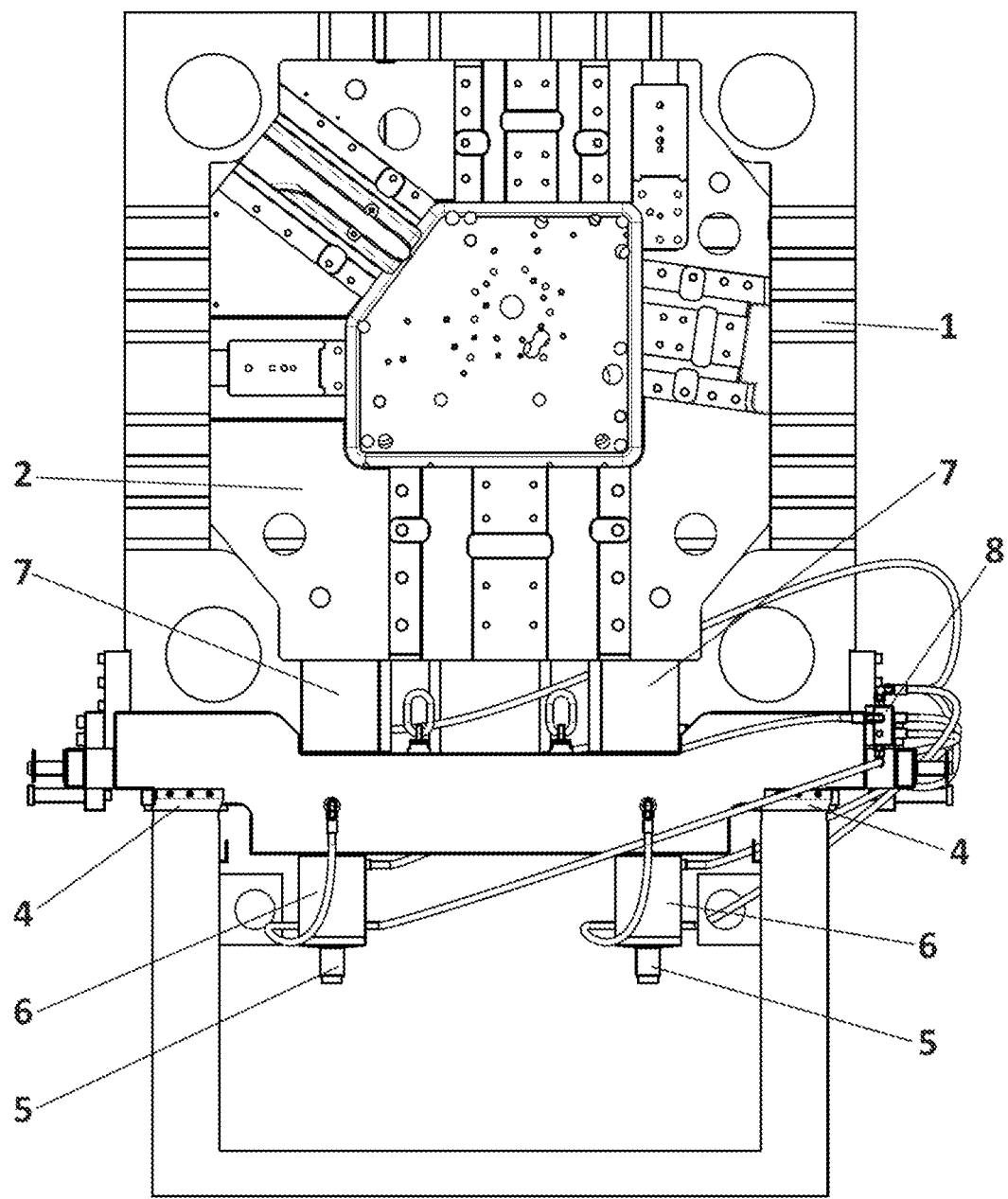
FIG. 2 is a front view of the bearing system for molds according to the present invention, assembled in the mold of FIG. 1.

As shown in the drawings, the bearing system according to the present invention is used in a mold, for example, an injection mold, the moving part of which weighs about 10,000 kg, comprising a fixed part (not depicted in the drawings) and a moving part 2, which moves horizontally to close the mold. According to the depicted embodiment, said moving part 2 is assembled on the moving plate 1 of the injection machine.

According to the present invention, the moving part 2 of the mold is borne by means of a bearing system comprising a sliding mold carrier 3, which slides on sliding elements 4.

In order to allow vertically adjusting the position of said moving part 2 of the mold, the sliding mold carrier 3 comprises hydraulic support elements 5, such as two or more hydraulic cylinders, that go through said sliding mold carrier 3 and project in the upper and lower portions, the upper end thereof being in contact with the lower part of the moving part 2 of the mold, according to the depicted embodiment.

Said hydraulic cylinders 5 comprise a flange 6 in their lower part, according to the depicted embodiment. The guard 7, which is formed by a housing made of sheet metal, for example, prevents accidental impacts against the hydraulic cylinders 5, which could break due to the weight of the mold.

In turn, the flange 6 allows blocking the movement of each hydraulic cylinder 5 when placed in the desired position, which will be described below.

The bearing system is integrally attached to the moving plate of the injection machine by means of two side plates 8. To regulate the relative horizontal position between the sliding mold carrier 3 and the moving plate 1 of the injection machine, the bearing system according to the present invention comprises regulating plates 8, provided with a plurality of holes for placing a fixing element between the sliding mold carrier 3 and the moving plate 1 of the machine, depending on the desired relative horizontal position to be achieved.

The present invention also relates to the method for regulating the position of the moving part 2 of a mold using the bearing system mentioned above.

In this method, the moving part 2 of the mold is first assembled on the machine, the machine is completely closed, and the part is fixed to the plate of the injection machine.

Once the moving part 2 is in place, one of the hydraulic support elements 5 moves until coming into contact directly with the moving part 2 or the moving plate 2. The hydraulic support element 5 will move until a pre-determined pressure is detected, which pre-determined pressure will indicate that the hydraulic support element 5 is in the correct position, bearing the weight of the moving part 2.

Once this pre-determined pressure is detected, the vertical movement of each hydraulic support element 5 is stopped, blocking the vertical movement of each hydraulic support element by means of said flange 6, preventing the hydraulic support element 5 from moving.

Merely by way of example, the maximum stroke of the support elements 5 is envisaged to be 50 mm and its minimum stroke is envisaged to be 25 mm, with a precision of 0.1 mm.

Next the same is done with a second hydraulic support element 5, and if there are more hydraulic support elements, it will be done sequentially, i.e., one after the other, until all the hydraulic support elements 5 have been placed in the correct position determined by said pre-determined pressure.

In order to disassemble the mold, the method is performed in reverse by vertically moving each hydraulic support element 5 downwards. When all the hydraulic support elements 5 are in their suitable position, the moving part 2 will be removed from the mold.

Despite having made reference to a specific embodiment of the invention, it is obvious for a person skilled in the art that the described bearing system and method are susceptible to a number of variations and modifications, and that all the mentioned details can be replaced with other technically equivalent ones without departing from the scope of protection defined by the attached claims.

The invention claimed is:

1. A bearing system for a mold that includes a fixed part and a moving part, the bearing system comprising:

a sliding mold carrier including movable support elements that are each configured to extend through the sliding mold carrier vertically beyond an upper surface and a lower surface of the sliding mold carrier, contact the moving part of the mold and adjust a vertical position of the moving part, each of said vertically movable support elements include a flange, which is configured to prevent movement of the support elements when a predetermined pressure is achieved between the support elements and the moving part, arranged below the lower surface of the sliding mold carrier and extending over a portion of each of the moveable support elements with a lower end of each of the movable support elements extending beyond the flange, wherein said support elements are hydraulic support elements.

2. The bearing system for the mold according to claim 1, wherein said hydraulic support elements comprise two or more hydraulic cylinders.

3. The bearing system for the mold according to claim 1, further comprising a guard arranged between the upper surface of the sliding mold carrier and the moving part and extending over an upper end of each of the hydraulic support elements to prevent impact by the mold on the hydraulic support elements.

4. The bearing system for the mold according to claim 1, wherein the flange extends over a lower portion of each of the hydraulic support elements and contacts the lower surface of the sliding mold carrier.

5. The bearing system for the mold according to claim 1, further comprising a regulating plate that is configured to control a horizontal position of the sliding mold carrier with respect to a moving plate, on which the moving part is assembled, of an injection machine.

6. The bearing system for the mold according to claim 5, wherein said regulating plate comprises a plurality of holes that are each configured to receive a fixing element to secure the sliding mold carrier and the moving plate of the injection machine to each other at a desired position.

\* \* \* \* \*